(12) United States Patent
Juranitch et al.

(10) Patent No.: US 11,802,662 B2
(45) Date of Patent: Oct. 31, 2023

(54) LARGE SCALE COST EFFECTIVE DIRECT STEAM GENERATOR SYSTEM, METHOD, AND APPARATUS

(71) Applicant: XDI Holdings, LLC, Bedford, NH (US)

(72) Inventors: James Charles Juranitch, Fort Lauderdale, FL (US); Raymond Clifford Skinner, Coral Springs, FL (US); Thomas Raymond Juranitch, Delray Beach, FL (US); Alan Craig Reynolds, Novi, MI (US)

(73) Assignee: XDI Holdings, LLC, Bedford, NH (US)

( * ) Notice: Subject to any disclaimer, the term of this patent is extended or adjusted under 35 U.S.C. 154(b) by 0 days.

(21) Appl. No.: 17/579,307

(22) Filed: Jan. 19, 2022

(65) Prior Publication Data
US 2022/0282833 A1    Sep. 8, 2022

Related U.S. Application Data

(63) Continuation of application No. 16/329,471, filed as application No. PCT/US2017/049613 on Aug. 31, 2017, now Pat. No. 11,262,022.

(60) Provisional application No. 62/381,983, filed on Aug. 31, 2016.

(51) Int. Cl.
| | |
|---|---|
| *F22B 3/02* | (2006.01) |
| *F23J 15/02* | (2006.01) |
| *F16T 1/00* | (2006.01) |
| *F22B 37/48* | (2006.01) |
| *F23J 15/06* | (2006.01) |
| *F23L 7/00* | (2006.01) |

(52) U.S. Cl.
CPC ............... *F16T 1/00* (2013.01); *F22B 3/02* (2013.01); *F22B 37/48* (2013.01); *F23J 15/06* (2013.01); *F23L 7/007* (2013.01); *F23J 2219/40* (2013.01); *F23L 2900/07007* (2013.01); *Y02E 20/30* (2013.01); *Y02E 20/34* (2013.01)

(58) Field of Classification Search
CPC .... E21B 43/24; F24H 1/00; F22B 3/02; F22B 37/42; F22B 1/24; F22B 1/26; F23L 7/00; F23J 15/02; B05B 7/10; F01K 7/30; F01K 7/44; F22G 1/02; Y02E 20/14
See application file for complete search history.

(56) References Cited

U.S. PATENT DOCUMENTS

| | | |
|---|---|---|
| 3,991,720 A | 11/1976 | Byerley |
| 4,042,813 A | 8/1977 | Johnson |

(Continued)

FOREIGN PATENT DOCUMENTS

| | | |
|---|---|---|
| JP | 2002079017 A | 3/2002 |
| WO | 2014107159 A1 | 7/2014 |

*Primary Examiner* — Gregory A Wilson
(74) *Attorney, Agent, or Firm* — Dykema Gossett PLLC

(57) ABSTRACT

Embodiments of the present disclosure include a system, method, and apparatus comprising a large scale direct steam generator operating on an oxidant of air or enriched air configured to generate steam and combustion exhaust constituents. An exhaust constituent separation system and an energy recovery system to reclaim energy and improve the efficiency of the thermodynamic cycle. An optional CO2 separation system and Non Condensable Gas injection system may be included.

19 Claims, 3 Drawing Sheets

(56) References Cited

U.S. PATENT DOCUMENTS

| | | | | |
|---|---|---|---|---|
| 4,498,542 A | * | 2/1985 | Eisenhawer | F22B 1/26 |
| | | | | 166/57 |
| 4,502,419 A | | 3/1985 | Smith, Jr. | |
| 4,604,988 A | | 8/1986 | Rao | |
| 6,936,080 B2 | | 8/2005 | Murata et al. | |
| 7,780,152 B2 | | 8/2010 | Rao | |
| 8,522,871 B2 | | 9/2013 | Anderson et al. | |
| 9,146,035 B2 | * | 9/2015 | Boulet | F01K 17/04 |
| 2005/0241311 A1 | * | 11/2005 | Pronske | F25J 3/04545 |
| | | | | 60/648 |
| 2011/0076630 A1 | | 3/2011 | Jameel | |
| 2012/0222426 A1 | * | 9/2012 | Macadam | B01D 53/002 |
| | | | | 60/39.5 |
| 2013/0125554 A1 | | 5/2013 | Mittricker et al. | |
| 2014/0137779 A1 | | 5/2014 | Pronske et al. | |
| 2015/0369025 A1 | * | 12/2015 | Latimer | E21B 43/24 |
| | | | | 166/57 |
| 2016/0034889 A1 | | 2/2016 | Downs et al. | |
| 2016/0348895 A1 | | 12/2016 | Juranitch et al. | |
| 2018/0133640 A1 | * | 5/2018 | Boulet | B01D 53/62 |
| 2019/0257472 A1 | | 8/2019 | Juranitch et al. | |

* cited by examiner

LARGE SCALE COST EFFECTIVE DIRECT STEAM GENERATOR SYSTEM, METHOD, AND APPARATUS

CROSS-REFERENCE TO RELATED APPLICATIONS

This application is a continuation of U.S. application Ser. No. 16/329,471, filed 28 Feb. 2019 (the '471 application), which is the national stage application of International application no. PCT/US2017/049613, filed 31 Aug. 2017 (the '613 application) and published under International publication no. WO 2018/045169 on 8 Mar. 2018. This application claims the benefit of U.S. provisional application No. 62/381,983, filed 31 Aug. 2016 (the '983 application). The '471 application, '613 application and the '983 application are all hereby incorporated by reference in their entirety as though fully set forth herein.

FIELD OF THE INVENTION

Embodiments of the present disclosure relate generally to a method, apparatus and system for the cost effective generation of steam from a system and apparatus that places the steam feedwater in direct contact with a heat source with no separating tube or body as seen in a drum boiler or a Once Through Steam Generator (OTSG).

BACKGROUND

Direct Steam Generators (DSG) are not well accepted in industry in general and more specifically in industries that use SAGD, Steam Flood and CSS technology in heavy oil recovery. This can be due to the fact that the steam that is generated by a DSG is diluted with exhaust gas from the combustion process involved with a DSG. This causes problems in most hydrocarbon recovery processes. An additional reason that DSGs are not well accepted is that the currently available DSG systems are expensive to purchase and operate. Further, some DSGs are too small to be effective in the heavy oil recovery industry.

DETAILED DESCRIPTION

Figure 1:
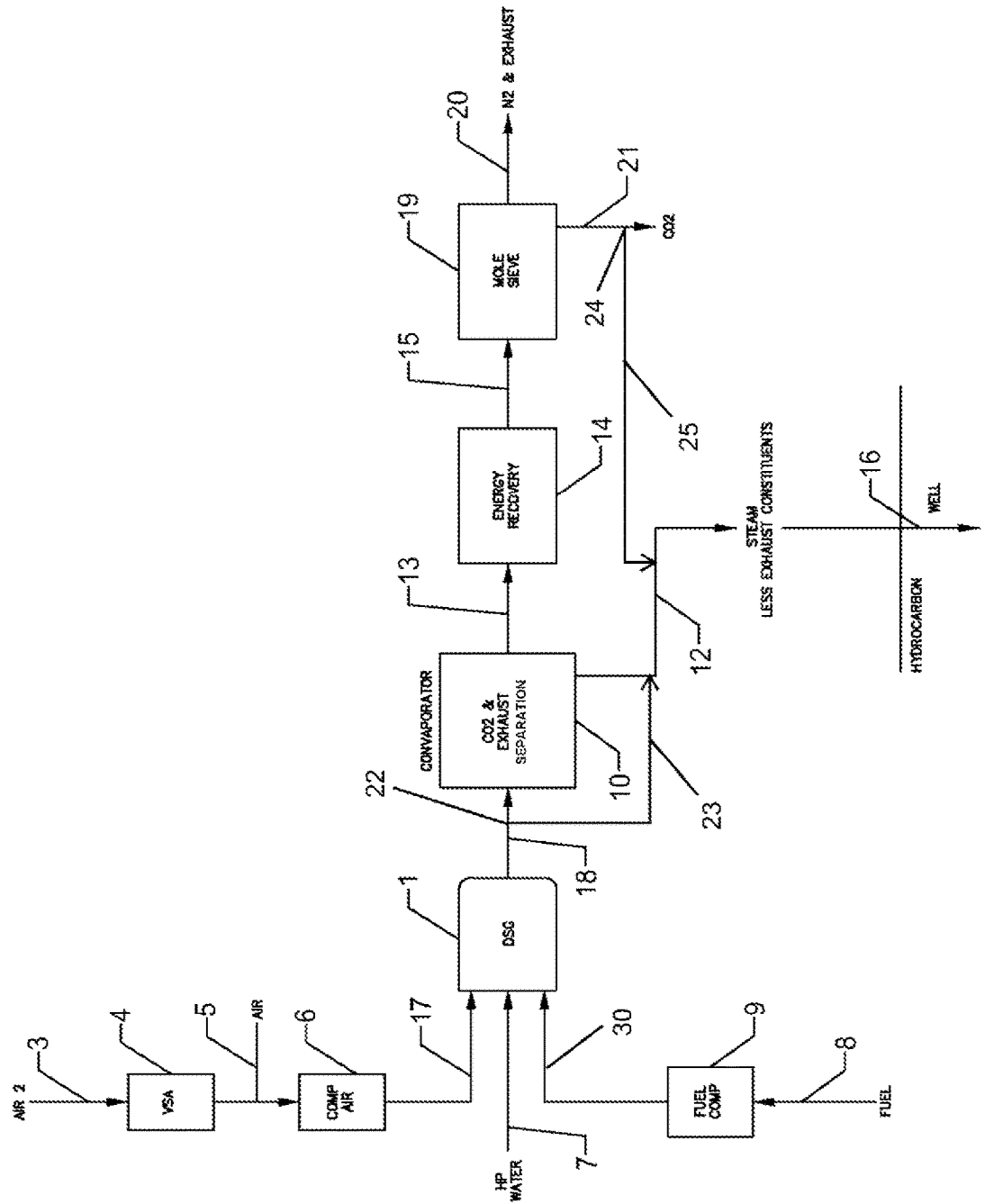
FIG. 1 depicts a simplified schematic representation of a dirty water, direct steam generation system (DSG), CO2 and exhaust constituent separation system, a Non Condensable Gas (NCG) system, an energy recovery system, and a mole sieve, in accordance with embodiments of the present disclosure.

Embodiments of the present disclosure relate generally to a method, apparatus and system for the cost effective generation of steam from a system and apparatus that places the steam feedwater in direct contact with a heat source with no separating tube or body as seen in a drum boiler or a Once Through Steam Generator (OTSG). The apparatus, method and system are capable of using dirty water, salty water and/or produced water as feedwater. The system, apparatus and method, in some embodiments, is capable of producing steam with a burner system larger than 200 million British Thermal Units per hour (MMBtu/h) and as large as 1,500 MMBtu/h. The system, apparatus and method can be used in any industry or application which needs steam such as power generation, for example. The system, apparatus and method can be used in the enhanced oil recovery industry in processes such as Steam Assisted Gravity Drainage (SAGD), Steam Flood, and/or Cyclic Steam Stimulation (CSS), along with other hydrocarbon recovery processes.

Direct Steam Generators (DSG) are not well accepted in industry in general and more specifically in industries that use SAGD, Steam Flood and CSS technology in heavy oil recovery. This can be due to the fact that:

1. The steam that is generated by a DSG is diluted with exhaust gas from the combustion process involved with a DSG. This causes problems in most hydrocarbon recovery processes.
2. The currently available DSG systems are expensive to purchase and operate.
3. Some DSGs are too small to be effective in the heavy oil recovery industry.

A number of patented or patent pending processes attempt to address the 3 problems above. All three problems must be solved to have a commercially viable product, process and system. US patent application no. 2014/0137779 A1 utilizes a DSG that can be described as a rocket combustor. It operates on a high pressure oxygen source to produce an exhaust constituent free stream and a separate CO2 stream. This application addresses problem 1 but fails to address problem 2. As detailed herein, this method is too expensive from a capital expenditure (CAPEX) and an operating expenditure (OPEX) standpoint to be a viable system or method for enhanced oil recovery. It also provides a significant safety risk for an oil field with its requirement of predominantly pure oxygen for combustion. This application does not suffer problem 3. It is scalable in size.

PCT application no. 2013/020349 suffers from problem 2 again requiring near pure oxygen to utilize its Ca(OH)2, CO2 separation process. It also suffers OPEX challenges from the expendable CO2 absorption material costs and the complexities of the system.

US publication no. 2015/0369025 A1 suffers from problem 2. U.S. application Ser. No. 15/166,109, which is incorporated by reference as though fully set forth herein, can also suffer from problem 2. U.S. Pat. No. 4,604,988 suffers from problems 1 and 3 and U.S. Pat. No. 7,780,152 B2 from problems 1 and 3.

Accordingly, a new and better cost effective DSG apparatus, system and process in both CAPEX and OPEX that separates the exhaust constituents from the steam, isolating the exhaust constituents from the well, that is large enough to run a modern hydrocarbon recovery processes is needed. Once separated, the exhaust constituents should be able to be metered for precise control and re-injected in the produced steam when desired as a NCG to aid in the oil production of mature wells and their eventual complete shutdown process.

Embodiments of the present disclosure include a system, method, and apparatus comprising a new direct steam generator (DSG) configured to generate saturated or superheated steam and combustion exhaust constituents. The DSG is designed to be of large scale and at the same time to be cost effective and minimize CAPEX. The hydrocyclone basis for the DSG minimizes the need for high cost exotic materials. It is also designed to operate on air or low level oxygen enriched air to again reduce system CAPEX and reduce OPEX. To continue to reduce OPEX and due to the novel DSG operating on air or low level oxygen enriched air, a new energy recovery system is taught. Conventional energy recovery systems are not adequate due to their inefficiencies associated with the high level of N2 mass flow associated with combustion using air or low level oxygen enriched air. Conventional energy recovery processes require too high an OPEX penalty to be viable. The system operates with an exhaust constituent separation system as described in previous patent disclosures.

FIG. 1 depicts a simplified schematic representation of a dirty water, direct steam generation system, a NCG system, CO2 and exhaust constituent separation system, and energy recovery system, and a mole sieve in accordance with embodiments of the present disclosure. In some embodiments low pressure air, depicted as air 2, enters a Vacuum Swing Absorption (VSA) module through air conduit 3. Additional low pressure air may be mixed in through conduit 5. The O2 enriched air mixture is then compressed in apparatus 6 (e.g., a compressor). In some embodiments, the air in compressor conduit 17 that enters the DSG 1 is approximately 40% O2 by volume. This level of enrichment is also considered by many safety organizations to cause no more of a safety hazard than pure air. As further discussed herein, the DSG 1 disclosed herein and depicted in FIG. 1 can operate from a ratio of 100% air to 100% O2, but a preferred range is 35% to 55% O2 by volume.

Utilizing a VSA instead of a conventional cryogenic oxygen plant is an important component in a series of components that reduce the OPEX and CAPEX of the present disclosure. Cryogenic oxygen plants have the advantage of producing large quantities of high pressure oxygen and are required for most DSGs since they require large amounts of pure oxygen for combustion or at least highly enriched air. Many times, the oxygen enriched air for these conventional DSG systems is at a volume ratio that exceeds 80% O2 in air. This requirement is related to their rocket engine based combustor. Examples of this DSG design are disclosed in US publication no. 2014/0137779 A1. Cryogenic Oxygen plants are large scale custom built plants. They typically have a staff of over 4 workers per shift. They have very high CAPEX costs since they are a large scale plant in their own right and are erected on site. Some modules make up portions of the plant but in the end they are a "Stick Built" plant. The significant staff and high maintenance requirements of the cryogenic plant have a significant negative effect on OPEX.

VSA's are self-contained modules that produce low pressure oxygen. Unfortunately, they cannot produce the large quantities of high pressure O2 as that produced by a cryogenic plant, but they are very cost effective to a significant size and are typically designed to run long term and unattended with little maintenance. These attributes are very positive for OPEX and CAPEX. The key to utilizing their savings is the ability of the disclosed DSG to run on low levels of oxygen enriched air which many times ranges from 35% to 55% O2 volume in air and the ability of the system to harvest the wasted energy from the large amount of N2 and other exhaust constituents carried by the combustion of air or minimally O2 enriched air.

The DSG 1, in FIG. 1, is in a preferred embodiment of this disclosure of significant size. The details of the DSG 1 are further discussed with respect to FIG. 2. Dirty water, which may be made up of fossil water, waste water, produced water and other components is pressurized to a high pressure which is of a higher pressure than a steam and exhaust product shown in outlet conduit 18 in FIG. 1. For example, the steam may be saturated or superheated and exhaust product in outlet conduit 18 can have a pressure in a range from 4 MPa to 19 MPa for SAGD applications.

Fuel that flows through fuel conduit 8 can be any liquid or gaseous hydrocarbon fuel, which would then be compressed to a pressure higher than the outlet pressure in conduit 18 and injected in conduit 30 into DSG 1. Steam and exhaust constituents are then injected into the CO2 and Exhaust Separation system 10, as disclosed in U.S. application Ser. No. 15/166,109, which is incorporated by reference as though fully set forth herein. This system is sometimes referred to as a convaporator system. Some conventional thermal energy recovery to feedwater or other processes that can accept thermal energy, or low level expansion which is typically limited to the freezing point of the entrained water vapor in conduit 18 may be accomplished in system 10, which is hereby incorporated by reference as though fully set forth herein, but may not be efficient enough to render the total system cost effective. Without energy recovery apparatus 14, the wasted energy remaining in the system flow shown in convaporator outlet 13 is of a large enough magnitude where the total system efficiency shown in the schematic of FIG. 1 cannot compete with conventional boiler systems in most industries. The OPEX costs for the complete system without the energy recovery apparatus, (system 14) can be cost prohibitive. Pure steam can be saturated or superheated and extracted via system 10, in some embodiments, and transferred through steam conduit 12 to a hydrocarbon recovery well 16, which may be the injector side of a Steam Assisted Gravity Drain (SAGD) or other hydrocarbon recovery application. Three-way valve 22 may be used to inject a controlled amount of exhaust constituents as a NCG into steam flow 12 through conduit 23 if desired for a mature well application.

An optional CO2 separation process may be implemented in separation apparatus 19. Many technologies are available for CO2 separation, but a preferred embodiment can include a mole sieve. The separated CO2 is expelled in CO2 conduit 21 and the remaining exhaust constituents primarily made up of N2 are expelled in exhaust constituent conduit 20.

A three-way valve 24 may be used to meter a controlled amount of CO2 in conduit 25 to again perform NCG functions. Many theories exist on the desire to inject large or small percentages of CO2 versus steam into an aging or mature well to improve oil recovery. Three-way valve 24 can also be used to inject a controlled amount of primarily N2 to blend with the CO2 in a ratio of inert N2 to CO2 and steam in a NCG application. In the case of a depleted well in proximity to the productive well being serviced by conduit 12, the depleted well may receive all the flow available from conduit 13, 20 or 21.

Figure 2:
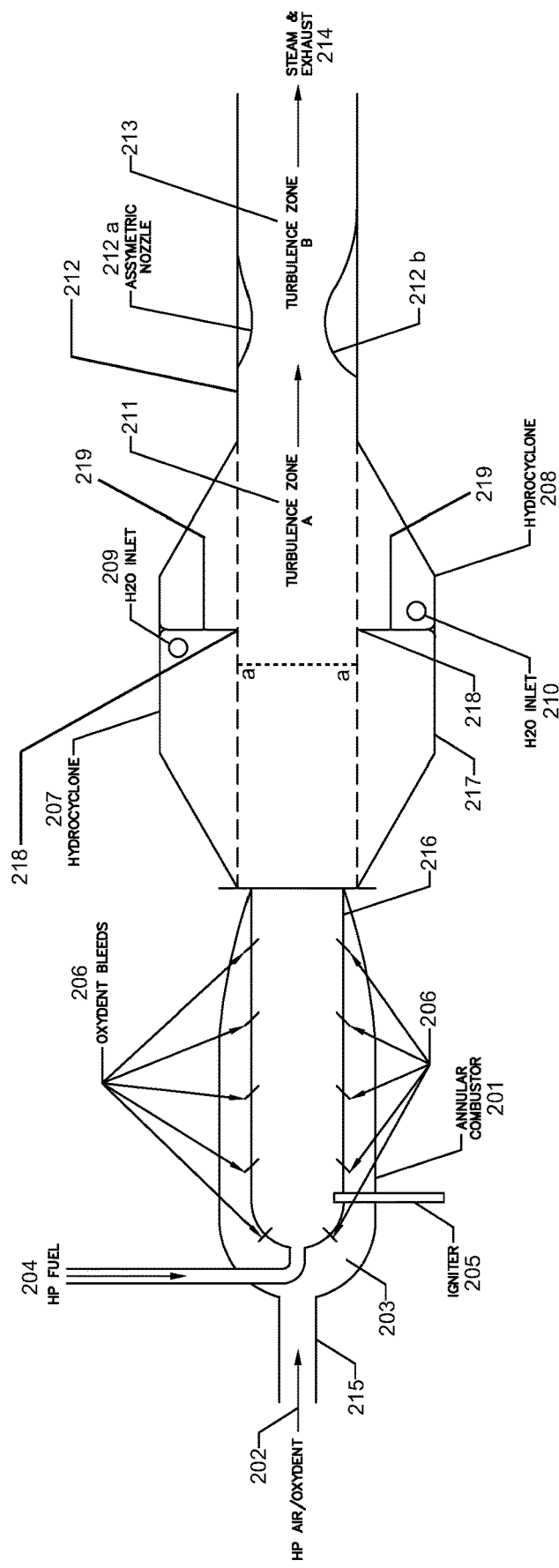
FIG. 2 depicts a DSG, which can be implemented in FIG. 1, in accordance with embodiments of the present disclosure.

FIG. 2 depicts a DSG, which can be implemented in FIG. 1, in accordance with embodiments of the present disclosure. Most available DSGs today are comprised of a burner from a rocket engine design as disclosed in US patent application no. 2014/0137779 A1 and PCT application no. 2013/020349. These combustors require pure or high levels of O2 greater than 80% by volume to operate. The DSG shown in FIG. 2 utilizes an annular combustor 201. Annular combustors are a byproduct of turbojet development. They can run on 100% air effectively. They can also run on O2 enriched air. They have the capability to operate at significant scale. U.S. Pat. No. 4,604,988, titled Liquid Vortex Gas Contactor, discloses many conventional burners for a hydrocyclone DSG design. As disclosed in U.S. Pat. No. 7,780, 152, titled Direct Combustion Steam Generator, all previous systems and combustors were not capable of producing any appreciable amount of steam due to their limited size.

Further, U.S. Pat. No. 7,780,152 Rao discloses "a diffusion burner wherein an inlet introduces fuel or oxygen-containing gas tangential to said flame". This "swirl-flow," which is essentially an air cyclone design burner, is limited to maximum combustion heat levels of 200 MM BTU/Hr. This small level is appropriate to Rao's application which is a single well in situ steam generator.

The annular combustor described in FIG. 2 can be much larger than 200 MM BTU/Hr and can be designed as a surface steam generation DSG for a complete enhanced oil recovery site or multi-well system. The physics of the design which effectively mix oxidants such as air while maintaining cooling through the mixture flow at the combustor walls allow the combustor to generate over 2,000 MM BTU/Hr of heat. In two ideal embodiments, each single annular combustor 201 is sized to produce 350 MM BTU/Hr of heat and 850 MM BTU/Hr of heat respectively. Details of a preferred embodiment of an annular combustor are as follows: High pressure air or enriched air shown as feed air 202 can enter feed air conduit 215, which leads to plenum 203. Inner chamber 216 is fed high pressure fuel through high pressure fuel conduit 204, which is fluidly coupled with inner chamber 216. High pressure fuel 204 can be any hydrocarbon fuel, including liquids and gasses. Igniter 205 is disposed in proximity to fuel conduit 204. Oxidant bleeds 206 disposed in a wall that defines inner chamber 216 can supply air or oxygen enriched air. In an example, the oxidant bleeds 206 can fluidly couple the inner chamber 216 with the plenum 203. The enrichment ratio can be 0 to 100%. A preferred air enrichment embodiment can be 35% to 55% oxygen by volume.

Chamber 217 can be a hydrocyclone chamber. Industrial cyclones have traditionally been used for dust removal. As disclosed in U.S. Pat. No. 4,604,988, a hydrocyclone can be used to produce hot water and steam. U.S. Pat. No. 7,780,152 discloses an improved hydrocyclone with a larger burner optimized to produce limited amounts of steam for an in-situ well application with a burner that has a size up to 200 MM BTU/Hr. In these smaller applications, the diameter of the hydrocyclone is optimized to a small diameter due to the in-situ well pipe constraint. The mixing of the heat and the water to create steam due to the small diameter is therefore significantly easier.

In this disclosure, the novel DSG can include 2 counter rotating cyclones, caused by a first hydrocyclone portion 207 and a second hydrocyclone portion 208. Injection ports 209 and 210 are in opposite orientations to cause the opposing hydrocyclones to occur. At boundary point 218, the two hydrocyclones collide and cause mechanical mixing with the heat generated from annular combustor 201. In some embodiments, the boundary point can be formed by a wall 219 that radially extends from an inner wall of the chamber 217 that forms the first hydrocyclone portion 207 and the second hydrocyclone portion 208. The wall 219 can extend radially inward from the inner wall that forms the first hydrocyclone portion 207 and the second hydrocyclone portion 208 to define an opening with a diameter represented by line aa. In some embodiments, opposing ends of the first hydrocyclone portion 207 and the second hydrocyclone portion 208 can be tapered. For example, an inlet end of the first hydrocyclone portion 207 can be tapered toward an inlet (e.g., the end coupled to the inner chamber 216) and the outlet end of the second hydrocyclone portion 208 can be tapered toward an outlet. In some embodiments, a turbulence zone A 211 aids in heat transfer for the production of high quality steam and exhaust constituents and is caused by the collision of the first hydrocyclone and second hydrocyclone that are formed by the first hydrocyclone portion 207 and the second hydrocyclone portion 208.

As disclosed in U.S. Pat. No. 7,780,152, a convergent divergent nozzle is used in the downstream portion of the DSG. This device can provide an efficient way of causing an increased velocity and a low pressure zone and can be used to promote mixing of the water droplets and combustor heat to promote the production of steam. For a small scale DSG, such as less than 200 MMBtu/hr, this convergent divergent nozzle is acceptable. However, the convergent divergent nozzle has a very limited turn down ratio. In other words, it is only effective in a small operating range and is not effective in or an acceptable characteristic in a large scale DSG such as a DSG in the range of 350 MMBtu/hr to 1,500 MMBtu/hr such as that discussed herein.

Due to the large scale associated with embodiments of the present disclosure, a large turn down rate such as 10:1 is highly desired. To accomplish this, an asymmetric nozzle is utilized in a nozzle pipe 212. The nozzle pipe has a large operating range or turn down rate such as 10:1 that produces a rotating stall and a significant rotating low pressure mixing zone. This characteristic in a preferred embodiment increases the efficiency of the steam production in turbulence zone B 213 in the large scale DSG. In some embodiments, a foil or wing shaped protuberance can be included in a first turbulence portion 212a and a second turbulence portion 212b. In some embodiments, the first turbulence portion 212a can be smaller than the second turbulence portion 212b, which produces the asymmetric nozzle and the large turndown rate. Steam production combined with exhaust constituents is shown exiting the DSG as steam and exhaust 214.

Figure 3:
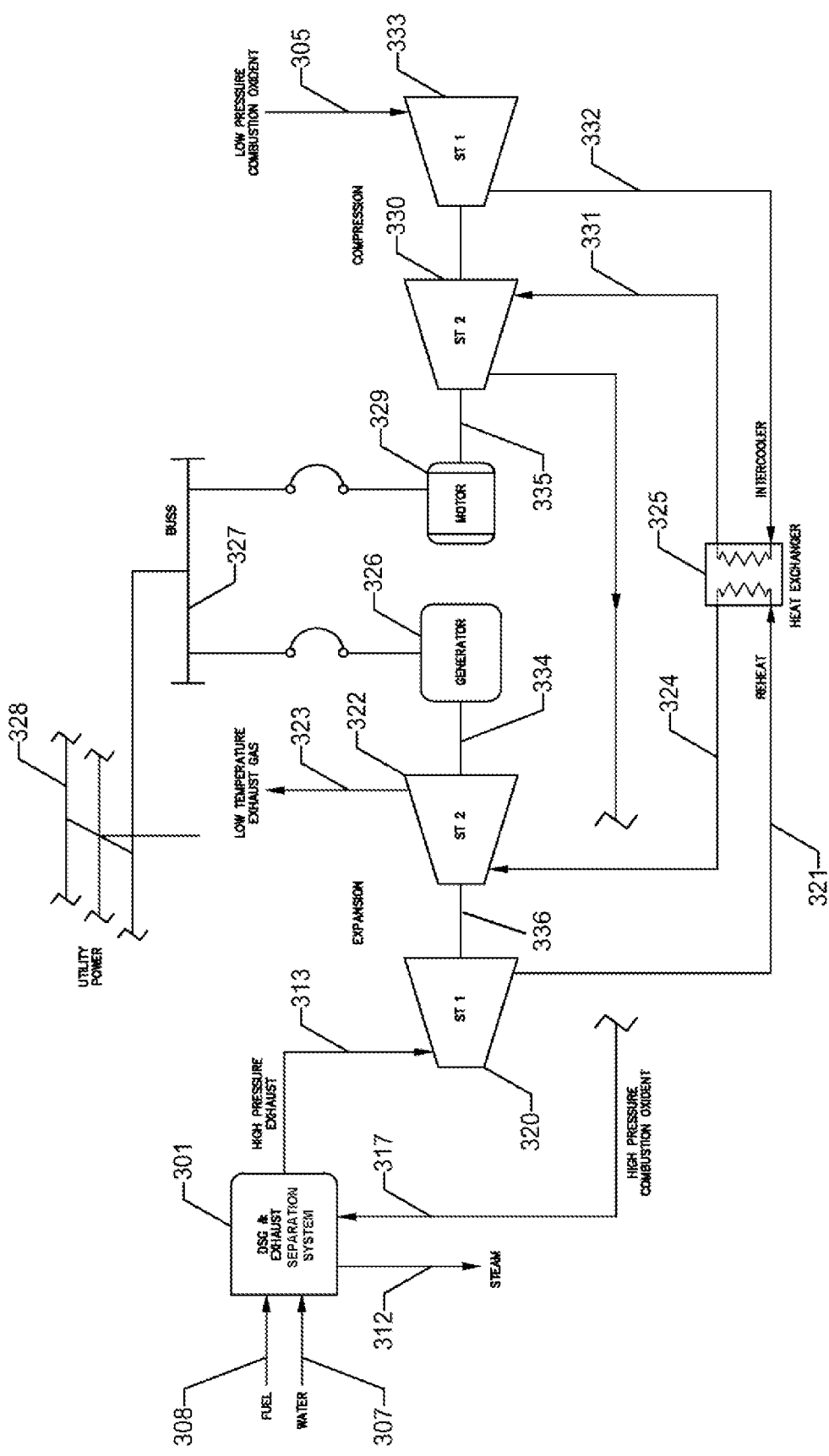
FIG. 3 depicts an energy recovery system, in accordance with embodiments of the present disclosure.

FIG. 3 depicts an energy recovery system in accordance with embodiments of the present disclosure. DSG and exhaust separation system 301 can include those elements discussed in relation to FIG. 1 and FIG. 2. High pressure fuel conduit 308 can feed pressurized fuel from a range of 4 MPa to 19 Mpa in SAGD applications to the DSG and exhaust separation system 301, water conduit 307 can feed water to the DSG and exhaust separation system 301, and oxidant conduit 317 can feed an oxidant to the DSG and exhaust separation system 301. In some embodiments, energy recovery can be included in the DSG and exhaust separation system 301 such as thermal recovery and limited expansion. Unfortunately, limited energy recovery can be accomplished by thermal recovery or limited mechanical expansion. The unconventional oil recovery process has very little use for low or even medium temperature water or recovered thermal energy. Due to the entrained water vapor in the high pressure exhaust conduit 313, as the mass flow is expanded to any significant level to significantly reclaim energy, the entrained water vapor can turn to ice and destroy an expander.

The mass flow and stored energy in high pressure exhaust conduit 313 can be large enough where an acceptable method to reclaim the stored energy is required. Without reclaiming the stored energy in the high pressure exhaust conduit 313, the total system may not be economically viable when compared to conventional boiler system efficiencies. The OPEX for the total system can become too great, if stored energy is not reclaimed in the high pressure exhaust conduit 313. The energy requirement due to the energy associated with pumping to produce high pressure combustion oxidant in conduit 317 can also be great. Without reclaimed energy supplementing the compression energy, the overall system OPEX can again be challenged.

A preferred embodiment of a system that solves the above OPEX challenges is shown in FIG. 3. High pressure exhaust 313 can be expanded through a first expander 320 (e.g., stage (ST) 1 expander). This first stage of expansion can be limited to an outlet temperature above the freezing point of water at outlet 336 to prohibit the production of ice crystals. The partially expanded exhaust can flow through conduit 321 to heat exchanger 325, which can be used as a reheater. A reheated exhaust flow is provided via the heat exchanger 325 to a reheat conduit 324, which can then be fed into a second expander 322 (e.g., stage (ST) 2 expander). Although only two stages of expansion are depicted, greater than two stages of expansion and reheat are possible to gain system efficiency. In some embodiments, 2 to 5 stages of expansion can be used to gain system efficiency. In some embodiments, greater than 5 stages of expansion can be used to gain system efficiency. In some embodiments, spent low temperature exhaust is directed through conduit 323 to potentially be further processed through an optional CO2 separation system. The recovered mechanical energy is communicated by shaft 334 to generator 326. The reclaimed electrical power is applied to electrical buss 327 which in some embodiments is supplemented by main electrical system 328. The connection of generator 326 in a preferred embodiment to electrical buss 327 and its connection to main utility power 328 aids and is important in keeping the energy recovery system stable.

Electrical energy from buss 327 is converted to mechanical energy through motor 329 which turns compressor shaft 335 in direct communication with a first compressor stage 330 (e.g., ST 1) and second compressor stage 333 (e.g., ST 2). In some embodiments, more than 2 stages could be utilized. For example, two to four stages can be utilized. The heat of compression is fed through compression conduit 332 and processed through heat exchanger 325, which now acts as an intercooler for the charge air in conduit 331 to the second compressor stage 330. A low pressure combustion oxidant can be fed to the second compressor stage 333 via oxidant conduit 305. The low pressure combustion oxidant could have a ratio of O2 enriched air of 0% to 100%.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the endoscope of the embodiments, the endoscope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a large scale cost effective direct steam generator system, method, and apparatus has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system for generating steam, comprising:
a direct steam generator configured to generate saturated or superheated steam and combustion exhaust constituents;
a close coupled heat exchanger fluidly coupled to the direct steam generator, the close coupled heat exchanger configured to route the saturated or superheated steam and combustion exhaust constituents through an exhaust constituent removal system; and
an energy recovery system that reclaims the energy from the exhaust constituents, wherein N2 is separated from at least some of the exhaust constituents via an exhaust constituent separation system and is injected into an oil well as a non-condensable gas, via an injection conduit.

2. The system of claim 1, wherein the direct steam generator is configured with counter rotating hydrocyclones to generate the saturated or superheated steam and combustion exhaust constituents.

3. The system of claim 1, wherein an oxidant for the direct steam generator is pure air.

4. The system of claim 1, wherein an oxidant for the direct steam generator is oxygen enriched air that is enriched up to 100%.

5. The system of claim 1, wherein the energy recovery system includes an energy recovery expansion generator that is connected to a main utility buss.

6. The system of claim 1, wherein the energy recovery system has greater than 1 stage of compression cooling.

7. The system of claim 1, wherein the exhaust constituents are further reduced by CO2 separation.

8. The system of claim 7, wherein CO2 is separated from the exhaust constituents and is used for oil well injection as a non-condensable gas.

9. The system of claim 8, wherein N2 and CO2 are blended at a metered ratio and used for well injection as a non-condensable gas.

10. The system of claim 1, further comprising generating O2 for air enrichment by at least 1 vapor swing absorption module.

11. The system of claim 1, wherein the exhaust constituents are further reduced by CO2 separation.

12. A system for generating steam, comprising:
a direct steam generator configured to generate saturated or superheated steam and combustion exhaust constituents;
a close coupled heat exchanger fluidly coupled to the direct steam generator, the close coupled heat exchanger configured to route the saturated or superheated steam and combustion exhaust constituents through an exhaust constituent removal system; and
an energy recovery system that reclaims the energy from the exhaust constituents, wherein N2 and CO2 are separated and are blended at a metered ratio and used for well injection as a non-condensable gas.

13. The system of claim 12, wherein CO2 is separated from the exhaust constituents and is used for oil well injection as a non-condensable gas.

14. The system of claim 12, further comprising generating O2 for air enrichment by at least 1 vapor swing absorption module.

15. A system for generating steam, comprising:
a direct steam generator configured with an annular combustor to generate saturated or superheated steam and combustion exhaust constituents;
a close coupled heat exchanger fluidly coupled to the direct steam generator, the close coupled heat exchanger configured to route the saturated or superheated steam and combustion exhaust constituents through an exhaust constituent removal system; and
an energy recovery system that reclaims the energy from the exhaust constituents, wherein N2 and CO2 are separated and are blended at a metered ratio and used for well injection as a non-condensable gas.

16. The system of claim 15, wherein the direct steam generator is configured with counter rotating hydrocyclones to generate the saturated or superheated steam and combustion exhaust constituents.

17. The system of claim 15, wherein the direct steam generator further comprises an asymmetric nozzle.

18. The system of claim 15, further comprising generating O2 for air enrichment by at least 1 vapor swing absorption module.

19. The system of claim 15, wherein the energy recovery system has greater than 1 stage of compression cooling.

\* \* \* \* \*